US009361269B1

(12) United States Patent  (10) Patent No.: US 9,361,269 B1
Todd et al.  (45) Date of Patent: Jun. 7, 2016

(54) KNOWLEDGE MANAGEMENT ACROSS DISTRIBUTED ENTITY USING PREDICTIVE ANALYSIS

(75) Inventors: Stephen Todd, Shrewsbury, MA (US); Yael Eliana Villa, Tel Aviv (IL); Rhonda L. Baldwin, Campbell, CA (US)

(73) Assignee: EMC Corporation, Hopkinton, MA (US)

( * ) Notice: Subject to any disclaimer, the term of this patent is extended or adjusted under 35 U.S.C. 154(b) by 91 days.

(21) Appl. No.: 13/338,886

(22) Filed: Dec. 28, 2011

(51) Int. Cl.
 *G06F 17/00* (2006.01)
 *G06N 5/02* (2006.01)
 *G06N 5/00* (2006.01)

(52) U.S. Cl.
 CPC ........ *G06F 17/00* (2013.01); *G06N 5/00* (2013.01); *G06N 5/02* (2013.01)

(58) Field of Classification Search
 None
 See application file for complete search history.

(56) References Cited

U.S. PATENT DOCUMENTS

| | | | |
|---|---|---|---|
| 6,560,589 | B1 | 5/2003 | Stier et al. |
| 2002/0054119 | A1 | 5/2002 | Dow et al. |
| 2005/0131825 | A1 | 6/2005 | Vijay |
| 2006/0112053 | A1 | 5/2006 | Jeanblanc et al. |
| 2007/0061353 | A1 | 3/2007 | Bobbin et al. |
| 2008/0046450 | A1 | 2/2008 | Marshall |

OTHER PUBLICATIONS

Zhen, L. et al. 'An Inner-Enterprise Knowledge Recommender System'. Expert Systems with Applications, Mar. 2010 vol. 37 No. 2, pp. 1703-1712 [online]. [retrieved on Sep. 19, 2013]. Retrieved from ScienceDirect.*
Zhen, L. et al. 'Recommender System Based on Workflow'. Decision Support Systems, Dec. 2009 vol. 48 No. 1 pp. 237-245 [online]. [retrieved on Sep. 19, 2013]. Retrieved from ScienceDirect.*
Nemati, H. et al. 'Knowledge Warehouse: An Architectural Integration of Knowledge Management, Decision Support, Artificial Intelligence and Data Warehousing'. Decision Support Systems, Jun. 2002 vol. 33 No. 2 pp. 143-161 [online]. [retrieved on Sep. 17, 2013]. Retrieved from ScienceDirect.*
Marston, S. et al. 'Cloud Computing—The Business Perspective'. Decision Support Systems, Apr. 2011 vol. 51 No. 1 pp. 176-189 [online]. [retrieved on Sep. 19, 2013]. Retrieved form ScienceDirect.*
Zhen, L. et al. "An inner-enterprise knowledge recommender system." Expert systems with Applications vol. 37 pp. 1703-1712 (2010).*
Chen, C. et al. "CiteSpace II: Detecting and visualizing emerging trends and transient patterns in scientific literature." Journal of the American Society for Information Science and Technology vol. 57 No. 3 pp. 359-377, (2006).*

(Continued)

*Primary Examiner* — Kakali Chaki
*Assistant Examiner* — Eric Nilsson
(74) *Attorney, Agent, or Firm* — Ryan, Mason & Lewis, LLP

(57) ABSTRACT

Information processing techniques are disclosed for managing knowledge across a distributed entity using predictive analysis. For example, a method comprises the following steps. At least a portion of the information is indicative of at least one of a previous expansion, a previous transfer and a previous leveraging of the knowledge attributable to the at least one distributed entity. A predictive analysis is performed on at least a portion of the obtained information to generate one or more recommendations for at least one of a future expansion, a future transfer and a future leveraging of the knowledge attributable to the at least one distributed entity.

19 Claims, 13 Drawing Sheets

(56) References Cited

OTHER PUBLICATIONS

Zhen, L. et al. "An inner-enterprise knowledge recommender system." Expert Systems with Applications 37.2 (2010): 1703-1712.*

Von Krogh, G. et al. "Making the most of your company's knowledge: a strategic framework." Long range planning 34.4 (2001): 421-439.*

Huang, H. et al. "Designing a knowledge-based system for strategic planning: A balanced scorecard perspective." Expert Systems with Applications 36.1 (2009): 209-218.*

Kljajic, M. et al. "Simulation approach to decision assessment in enterprises." Simulation 75.4 (2000): 199-210.*

Carayannis, E., et al. "Leveraging knowledge, learning, and innovation in forming strategic government—university—industry (GUI) R&D partnerships in the US, Germany, and France."Technovation 20.9 (2000): 477-488.*

Nemati, H., et al. "Knowledge warehouse: an architectural integration of knowledge management, decision support, artificial intelligence and data warehousing." Decision Support Systems 33.2 (2002): 143-161.*

P. Mell et al., "The NIST Definition of Cloud Computing," National Institute of Standards and Technology (NIST), Special Publication 800-145, Sep. 2011, 7 pages.

Alavi et al., "Knowledge Management and Knowledge Management Systems: Conceptual Foundations and Research Issues," MIS Quarterly, 2001, pp. 107-136, vol. 25, No. 1.

\* cited by examiner

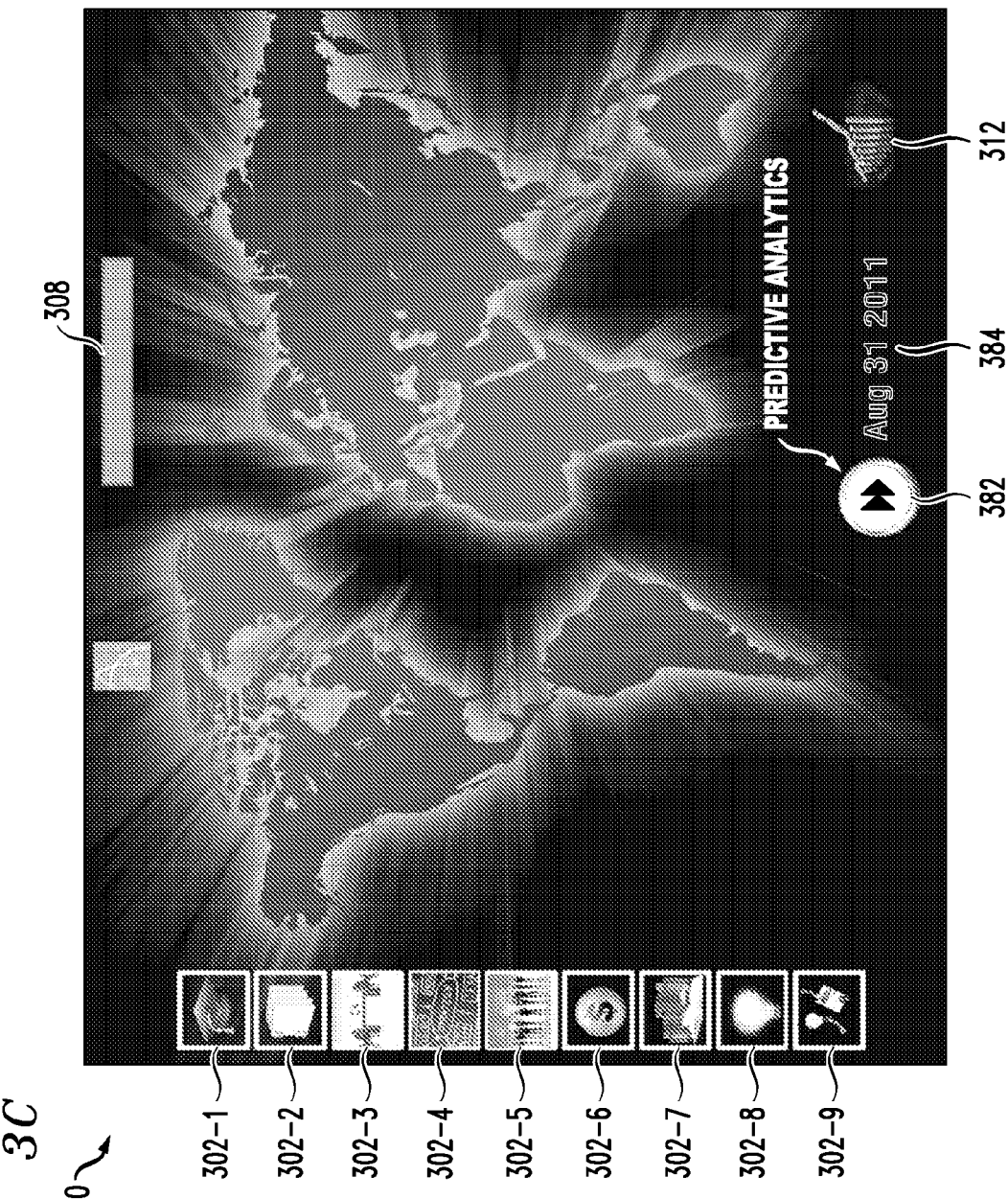

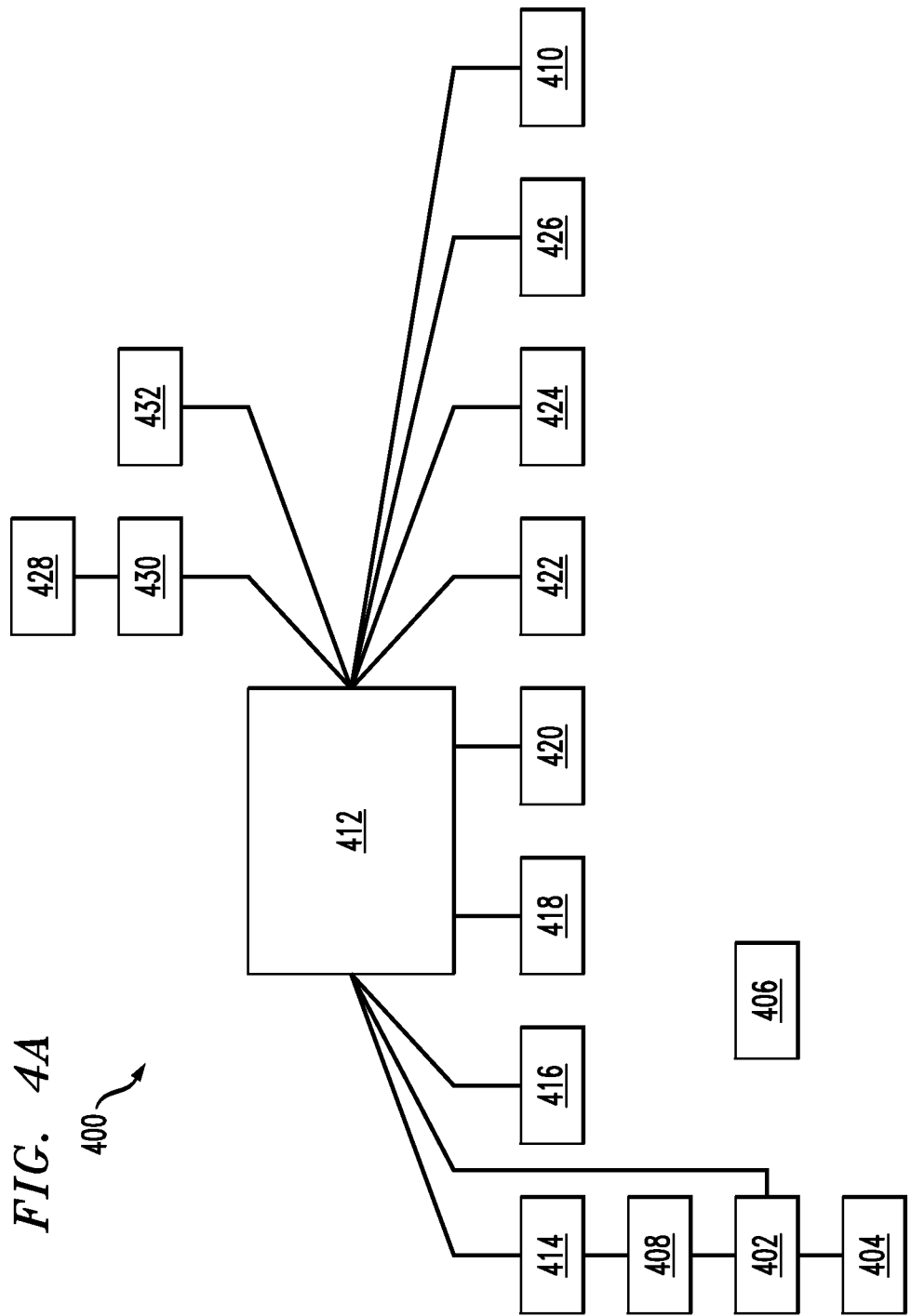

FIG. 4C gina.user

| | | | |
|---|---|---|---|
| P | * | employee_ID | VARCHAR (10) |
| | * | name | VARCHAR (60) |
| | * | email | VARCHAR (100) |

🔑 PRIMARY (employee_ID)

406

FIG. 4D gina.university

| | | | |
|---|---|---|---|
| P | * | id | INTEGER |
| | * | name | VARCHAR (80) |
| F | * | location_id | INTEGER |

🔑 PRIMARY (id)

◇ FK_university_1 (location_id)

408

FIG. 4E gina.strategic_driver

| | | | |
|---|---|---|---|
| P | * | id | INTEGER |
| | * | name | VARCHAR (60) |

🔑 PRIMARY (id)

| gina.abstract_event | | |
|---|---|---|
| P * id | INTEGER | |
| F * type | INTEGER | |
| * date | TIMESTAMP | |
| * location | INTEGER | |
| * main_contact | VARCHAR (60) | |
| * participants | VARCHAR (600) | |
| collateral | VARCHAR (300) | |
| knowledge_transfer_type | INTEGER | |
| visibility_level | INTEGER | |
| F parent_activity | INTEGER | |
| F * activity_type | INTEGER | |
| F * strategic_driver | INTEGER | |

⊙⇒ PRIMARY (id)

◇ FK_abstract_event_1 (location)
◇ FK_abstract_event_2 (type)
◇ FK_abstract_event_3 (parent_activity)
◇ FK_abstract_event_4 (activity_type)
◇ FK_abstract_event_5 (strategic_driver)

412

FIG. 4G gina.university_event

| | | |
|---|---|---|
| PF * | id | INTEGER |
| F * | university | INTEGER |

414 — ⌾ PRIMARY (id)

◇ FK_university_event_2 (university)

FIG. 4H gina.conference_event

| | | |
|---|---|---|
| PF * | id | INTEGER |
| * | name | VARCHAR (300) |

416 — ⌾ PRIMARY (id)

FIG. 4I gina.funding_event

| | | |
|---|---|---|
| PF * | id | INTEGER |

418 — ⌾ PRIMARY (id)

FIG. 4J gina.idea_incubation_event

| | | |
|---|---|---|
| PF * | id | INTEGER |

420 — ⌾ PRIMARY (id)

*FIG. 4K*

| gina.knowledge_transfer_event | | |
|---|---|---|
| PF * id | INTEGER | |
| ⚬→ PRIMARY (id) | | |

| gina.publication_event | | |
|---|---|---|
| PF * id | INTEGER | |
| * title | VARCHAR (400) | |
| * name | VARCHAR (400) | |
| ⚬→ PRIMARY (id) | | |

| gina.sales_event | | |
|---|---|---|
| PF * id | INTEGER | |
| ⚬→ PRIMARY (id) | | |

426

KNOWLEDGE MANAGEMENT ACROSS DISTRIBUTED ENTITY USING PREDICTIVE ANALYSIS

CROSS-REFERENCE TO RELATED APPLICATION

The present application is related to the U.S. patent application Ser. No. 13/338,864, entitled "Knowledge Management Across Distributed Entity," filed concurrently herewith, commonly assigned herewith, and incorporated by reference herein.

FIELD

The field relates to information processing, and more particularly to information processing techniques for managing knowledge across a distributed entity.

BACKGROUND

Managing information relating to knowledge or expertise across a distributed entity is a difficult task. For example, given the growth of collaboration between technologists associated with a corporate entity distributed throughout the world, one of the more difficult tasks in managing a corporate research portfolio is keeping track of what is occurring in each location with regard to technological developments and encouraging the transfer of that knowledge throughout the corporation.

Thus, parties in such globally-distributed corporations struggle in their ability to knowledge share despite the fact that they are otherwise connected over a distributed information processing system, e.g., public Internet or private company network. Such a lack of knowledge sharing can have a significant adverse impact on the viability of the globally-distributed corporation.

Furthermore, another difficult task is determining which areas of knowledge to pursue within a corporate research portfolio. With existing approaches, humans analyze data or follow hunches and apply resources in certain areas, but learn later that a better opportunity should have been pursued in another research and development area.

SUMMARY

Embodiments of the present invention provide information processing techniques for managing knowledge across a distributed entity using predictive analysis. This may include, for example, the management of knowledge expansion, transfer and leverage across the distributed entity and using predictive analysis techniques to make subsequent decisions.

For example, in one embodiment, a method comprises the following steps. Information is obtained representing knowledge attributable to at least one distributed entity. At least a portion of the information is indicative of at least one of a previous expansion, a previous transfer and a previous leveraging of the knowledge attributable to the at least one distributed entity. A predictive analysis is performed on at least a portion of the obtained information to generate one or more recommendations for at least one of a future expansion, a future transfer and a future leveraging of the knowledge attributable to the at least one distributed entity.

Further, the one or more recommendations may be displayed via a user interface, and the information representing the knowledge attributable to at least one distributed entity may be obtained from a database.

In another embodiment, a computer program product is provided which comprises a processor-readable storage medium having encoded therein executable code of one or more software programs. The one or more software programs when executed by a processor of a processing device implement steps of the above-described method.

In yet another embodiment, an apparatus comprises a memory and a processor operatively coupled to the memory and configured to perform steps of the above-described method.

Advantageously, embodiments of the predictive analysis techniques described herein serve to provide corporate strategists with a view into corporate research and innovation activities as well as new areas of emerging technology. Further, such predictive analysis techniques determine who, inside and/or outside the corporation, has expertise in one or more emerging concepts, as well as who would benefit from knowing information pertaining to such emerging concepts. The techniques can also prioritively assign estimated values to emerging concepts so that one or more of such concepts can be pursued based on these values.

These and other features and advantages of the present invention will become more readily apparent from the accompanying drawings and the following detailed description.

BRIEF DESCRIPTION OF THE DRAWINGS

FIGS. 3A through 3C show illustrative views of a graphical user interface of the knowledge management system of FIG. 1.

DETAILED DESCRIPTION

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the phrase "data object" or simply "object" refers to any given data item or data unit that may be part of an information network. An object or data object may take on any form and it is to be understood that the invention is not limited to any particular form. For example, an object may be electronic data such as one or more web pages, documents, files, images, videos, electronic mail (email), or any other type of data set, data item, or data unit. Thus, embodiments of the invention are not limited to any particular type of data object.

Still further, the term "knowledge," as used herein, refers to information. For example, this may include, but is not limited to, acquaintance with facts, truths, or principles, as from study or investigation; expertise; general erudition; familiarity or conversance, as with a particular subject or branch of learning; acquaintance or familiarity gained by senses, experience, or report; the fact or state of knowing; the perception of fact or truth; clear and certain mental apprehension; awareness, as of a fact or circumstance; something that is or may be known; a body of truths or facts accumulated in the course of time; the sum of what is known; as well as other related meanings.

Figure 1:
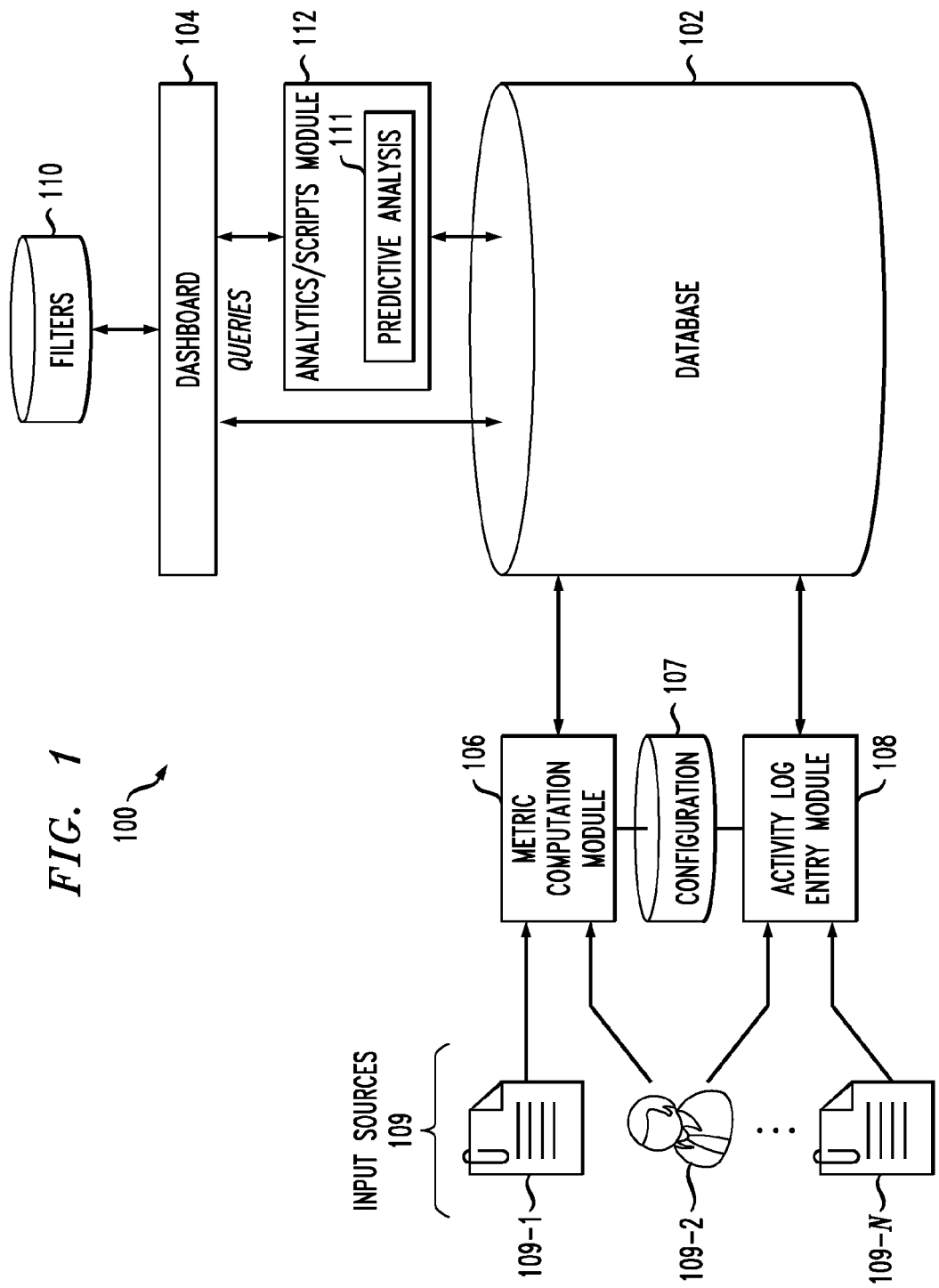
FIG. 1 shows a knowledge management system in accordance with one embodiment of the invention.

FIG. 1 shows a knowledge management system 100 configured in accordance with an illustrative embodiment of the present invention. The system 100 comprises a database 102, an interface (dashboard) 104, a metric computation module 106, a configuration store 107, an activity log entry module 108, input sources 109 (including 109-1, 109-2, ... 109-N), filter store 110, and predictive analytics/scripts module 112.

Database 102 is a database of information representing knowledge attributable to a distributed entity such as, in this example, a globally-distributed technology company. It is to be understood that while the type of knowledge that is being managed in the illustrative embodiments described herein relates to innovation and research in a globally-distributed technology company, embodiments of the invention are not limited to this type of knowledge. Rather, embodiments of the invention may be configured to manage other types of knowledge so as to track the expansion, transfer and leveraging of such knowledge. Also, a "distributed entity" is not limited to a globally-distributed or geographically-distributed technology company but rather comprises any entity that is distributed in such a way as to be able to benefit from the implementation of one or more embodiments of the knowledge management techniques described herein. Database 102 is maintained in accordance with a schema design that enables the inputting, querying, and outputting of data relating to knowledge that is acquired and/or possesed by (more generally, attributable to) the globally-distibuted company. An example of a database schema design that may be employed is illustratively described below in the context of FIGS. 4A through 4N.

Dashboard 104 provides an interface for presenting information maintained in database 102 and for presenting one or more responses to one or more queries to the database. An example of dashboard 104 is a graphical user interface. Such a graphical user interface will be illustratively described below in the context of FIGS. 3A through 3C.

Metric computation module 106 computes one or more metrics from one or more input sources 109. These computed metrics are stored in database 102. As shown, the input sources 109-1, 109-2, ... 109-N may include, but are not limited to, records containing information representing knowledge attributable to the company. Records may come from company documents such as, for example (but not limited to), emails, reports, publications, minutes-of-meetings, audio recordings, video recordings, and presentations. Records may also come from individuals inside and outside the company. Such individuals may therefore be considered input sources as well. The metrics may include, but are not limited to, quantitative values (e.g., total numbers) associated with one or more knowledge-based activities attributable to the company, e.g., the number of patent applications filed, the number of patents issued, the number of publications submitted/accepted, the number of technical conferences attended, etc. Further examples of such metrics will be described below. An alternative approach to metrics calculation would be for the analytics/scripts module 112 to scan the database on demand.

Activity log entry module 108 obtains one or more activity event entries and stores the entries in database 102. Such entries may come from one or more of the same sources 109 that provide information to module 106, or from other sources. The entries include, but are not limited to, descriptions of knowledge-based activities attributable to the company, e.g., filed patent applications, issued patents, submitted/accepted publications, attended technical conferences, etc. Further examples of such activities will be described below.

Configuration store 107 provides configuration information and instructions for formatting the metric and activity log entries into a form that can be readily stored in database 102. Embodiments of the invention are not limited to any particular formats. Example formats are given below in the context of the illustrative database schema design of FIGS. 4A-4N. Alternative formats may be employed.

Filter store 110 comprises filter definitions and instructions which are selectable and used to focus the interface on a particular area of knowledge, e.g., in this case, particular areas of research and innovation. Examples of filters will be described below in the context of the illustrative interface shown in FIGS. 3A and 3B.

Analytics/scripts module 112 executes algorithms that may be applied to information in database 102 based on selections made at dashboard 104. These algorithms may include, but are not limited to, word cloud summaries that identify keywords related to the area of knowledge, social network graphs that describe interactions between knowledge workers, and country-based categorization of knowledge expansion, e.g., what areas of knowledge are frequently discussed in a particular geography.

As will be illustrated and described below in the context of the globally-distributed technology company example, the elements and methodologies of knowledge management system 100 provide many features and advantages. For example, the system measures and visualizes the expansion of knowledge in a given region, measures and visualizes the transfer of that knowledge to other geographic locations, displays leverage events where the knowledge is turned into value for the company, and displays a lineage of the path that the knowledge took (and the people that transported that knowledge) on its way to being leveraged by the company and turned into value (e.g., publications, patents, products, and services).

In addition, as will be further described below in the context of FIGS. 3C, 5A and 5B, module 112 may also perform a predictive analysis 111 on data stored in the database 102. That is, while system 100 provides the ability to summarize innovation and research events that have happened in the past and allows an organization to track and monitor this information, the predictive analysis 111 performed by module 112 allows an organization to examine what has happened and recommend which new areas of knowledge should be expanded, transferred, and leveraged within an organization.

Although the system elements 102 through 112 are shown as separate elements in FIG. 1, these elements or portions thereof may be implemented at least in part on a common processing platform. In other embodiments, one or more of the system elements 102 through 112 may each be implemented on a separate processing platform, such as the processing platform to be described below in conjunction with FIG. 2. By way of example only, the database 102 may be implemented on a first processing device of a first processing platform and the dashboard 104 may be implemented on a second processing device of a second processing platform. The other system elements may be implemented on one or the other of these processing devices/platforms, or on one more other processing devices/platforms. It is also to be understood that a given embodiment of the system 100 may include multiple instances of the elements 102 through 112, although only single instances of such elements are shown in the system diagram for clarity and simplicity of illustration.

Figure 2:
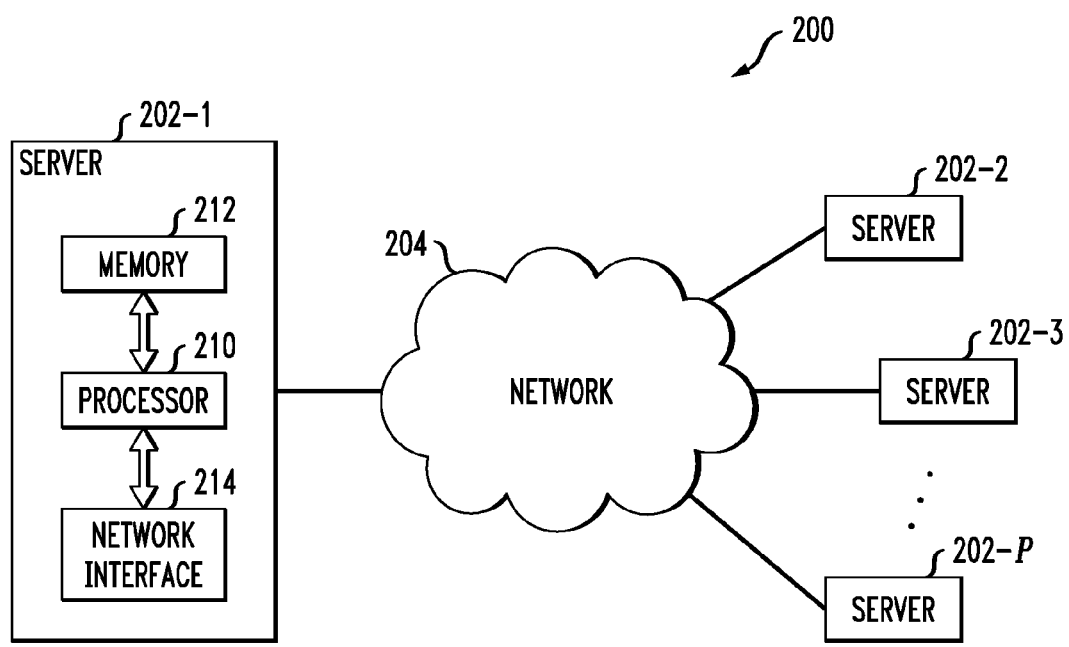
FIG. 2 shows a distributed information processing platform on which the knowledge management system of FIG. 1 is implemented in accordance with one embodiment of the invention.

An example of a processing platform on which the knowledge management system 100 of FIG. 1 may be implemented is information processing platform 200 shown in FIG. 2. The processing platform 200 in this embodiment comprises at least a portion of the system 100 and includes a plurality of servers, denoted 202-1, 202-2, 202-3, . . . 202-P, which communicate with one another over a network 204. One or more of the elements of system 100 may therefore each run on a server, computer or other processing platform element, which may be viewed as an example of what is more generally referred to herein as a "processing device." As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 204 and other system components. Such circuitry may comprise conventional transceivers of a type well known in the art.

The other servers 202 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 100 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Illustrative details of the knowledge management system 100 will now be described with reference to FIGS. 3A through 4N.

Figure 3A:
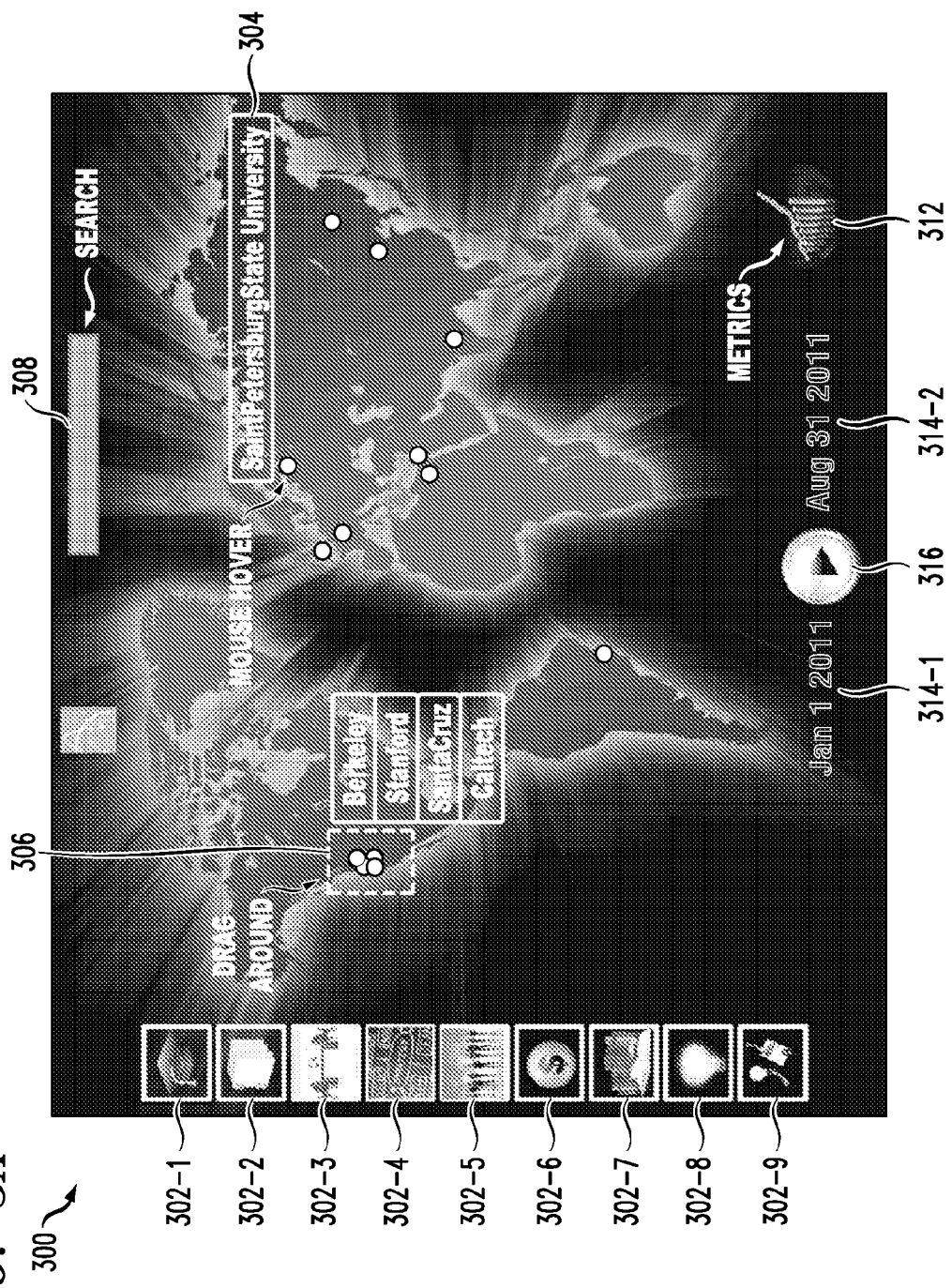
Figure 3B:
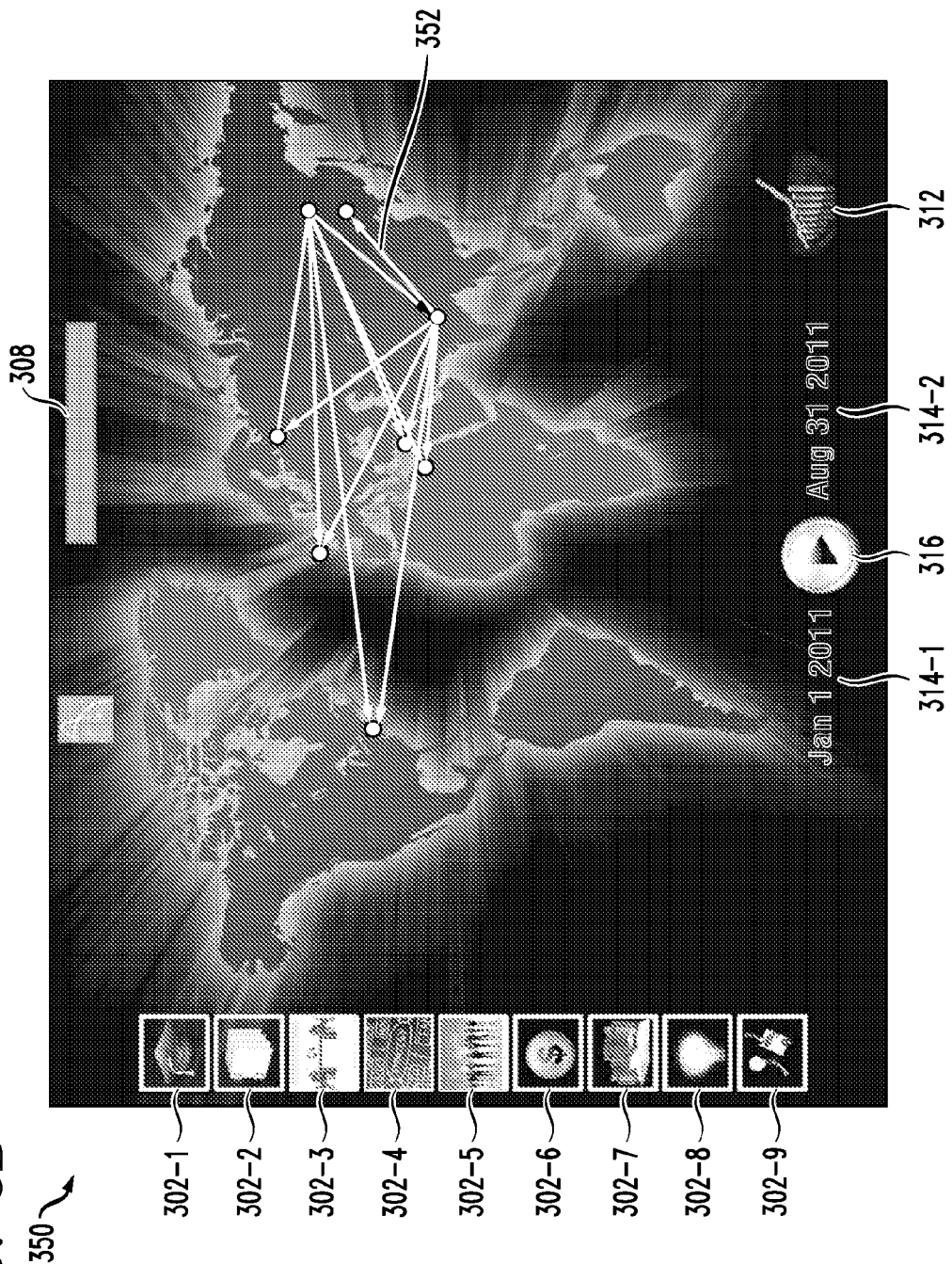

More particularly, FIGS. 3A through 3C show illustrative views of a graphical user interface of the knowledge management system of FIG. 1. That is, views 300 (FIG. 3A), 350 (FIG. 3B), and 380 (FIG. 3C) are part of dashboard 104. In this embodiment, dashboard 104 gives a global view into innovation and research activities at locations around the world and displays knowledge growth/transfer/leverage events that occur between geographic locations. View 300 illustrates the expansion of such knowledge across a map of the world, while view 350 illustrates the transfer of the knowledge. As will be explained below, the user may select the map to be viewed. Thus, while a worldwide map is shown in this example, it is to be understood that other geographic maps can be displayed, e.g., regions, countries, cities, etc.

As shown, the various dashboard views have several features for inputting data, selecting functions and operations, and outputting data. Views 300, 350, and 380 depict illustrative features, however, it is to be understood that those of ordinary skill in the art will realize other features that can be added or modified given the illustrative descriptions herein.

The dashboard views may be filtered. The features that are displayed on the dashboard can be focused by theme or by geography, or both. Icons 302-1 through 302-9 represent research and innovation themes that can be used to focus the views. In a graphical user interface presented on a display of a computing device, a user can select the icon by moving a mouse pointer over the theme icon and clicking on the theme icon. The view will then be rendered from the perspective of the selected theme.

More particularly, icon 302-1 represents a university (or educational institute) theme. When selected, the map is populated with points in the geographic locations of universities that the globally-distributed technology company has or has had relations. Relations may include, but are not limited to, connections such as employees of the company having visited the given university, university personnel having visited the company, the company and the given university working on (or having worked on) joint research projects, the company utilizing interns from the university, etc.

As shown in view 300 (FIG. 3A), by moving the mouse pointer over a point (304), or by dragging a selection box over one or more points on the map (306), the particular universities with which the company has relations are listed. Further, the user may select a particular listed university, and information about the particular nature of the relation can be displayed.

It is to be understood that the data that is displayed on the dashboard (e.g., universities, relations, etc.), or that is used to generate other data that is displayed, is accessed from the database 102 (FIG. 1), after having been input and stored in the database as explained above in the context of FIG. 1.

Theme icons 302-2 (publications), 302-3 (conferences), 302-4 (strategy), 302-5 (field/sales interlock), 302-6 (venture capital), 302-7 (knowledge growth and exchange), 302-8 idea contests and incubations), and 302-9 (intellectual property) operate in a similar manner as theme icon 302-1, i.e., when selected, they serve to focus the dashboard view to illustrate data specific to the theme (e.g., publications submitted/accepted, conferences attended, strategy data, interfaces between customers and sales forces, investments and opportunities, technology growth and transfer, idea developments, patents applications filed, patents issued, etc.).

Another feature on the dashboard includes the ability to "join" two or more themes so that data associated with each of the themes is displayed, or displayable, in the same view. For example, a user can select theme icon 302-1 and then select theme icon 302-2, and database information for university relations and publications are, or can be, simultaneously displayed on the worldwide map in view 300.

A further feature includes the ability to right-click on a theme icon which results in the ability to select a metric to be computed on the given theme. For example, assume the user right-clicks on theme icon 302-1, then metrics can be displayed for activities associated with universities (e.g., how many universities have been visited by company employees, how many universities have had personnel visit the company, etc.).

The dashboard is also configured to allow the user to select one or more countries/regions to be displayed in a view, as well as to select time and date constraints (e.g., the view can present current data and/or historical data that is selectable over time ranges).

As further shown in view 300 of FIG. 3A, a search field 308 is included as a feature in the dashboard. The search field permits entry of queries to database 102. The search can be performed in the context of the constraints that the user has selected using the themes (e.g., innovation categories) and countries that were selected to be displayed on the map. For example, if the user selected "university relations" and "Russia" on the map, and "September-October 2011," and then typed in the search term "cloud" in the search field, the system displays a separate screen with selectable links to all such activities in Russia within the selected date range containing the word "cloud." The search field 308 can also accept advanced search strings (e.g., a SQL query) to be executed by the system.

Metric icon 312 in the lower right-hand corner of view 300 displays the metrics previously stored in database 102 by computation module 106 (FIG. 1). Alternatively, these metrics can be calculated dynamically by analytics/scripts module 112. Examples of such metrics will be given below. Depending on the context and constraints (e.g., themes, date/time, geographic region) selected by the user, metrics are computed and displayed on the dashboard.

Date select icons 314-1 (start date) and 314-2 (end date) on either side of play button 316 represent specific calendar days in which to limit the display, i.e., create a time range. The play button 316 in between the date values allows the user to play the events based on the filtered selections, and watch an animated appearance representing local knowledge expansion and/or transfer of knowledge, with dots and/or arcs appearing on different nodes (and between different nodes) on the map. The dots and arcs represent filtered data in the database 104 (FIG. 1). "Pause" functionality is also provided (e.g., the play symbol is replaced by a pause symbol when animation is proceeding) in order to stop the animation.

Such an animation is illustratively depicted in view 350 of FIG. 3B as the plurality of node-interconnecting lines 352.

More particularly, the animation depicted as 352 is one example of how the lineage of strategically leveraged knowledge can be displayed. The dashboard can describe the lineage of the knowledge acquisition and flow right up until the delivery of a product, service, or patent. Also, as mentioned above, certain regions of the map (e.g., countries) are selectable and able to be highlighted. A hold-click functionality allows the selection of multiple countries (e.g., Russia and Ireland). This type of filtering limits search, metrics, and "play" functionality.

Many additional advantages and features may be implemented on the dashboard. For example, the dashboard is also configured to comparably measure knowledge growth/transfer/leverage capabilities between different geographies. For example, the dashboard allows a comparison of each geography's capabilities in order to take corrective action or encourage expansion/transfer or knowledge in a specific area. There is also the ability to uncover areas of the corporate strategic portfolio that are weak. The dashboard can compare the themes to the areas where knowledge is growing or transferring in those areas, and uncover themes that do not have broad support in the global research community.

Still further, as mentioned above, module 112 can perform a predictive analysis 111 on data that is in the database. As shown in view 380 of FIG. 3C, a predictive analytics button 382 may be selected by the user to initiate this function. The predictive analysis 111 obtains information from the database 102 indicative of a previous expansion, a previous transfer and/or a previous leveraging of the knowledge attributable to the corporation, and generates one or more recommendations for a future expansion, a future transfer and/or a future leveraging of such knowledge. The user can also specify the date in the future to which the predictive analysis recommendations should be forecasted. This is done via future date icon 384. The system 100 then generates an animation, similar to that shown in view 350 of FIG. 3B, whereby one or more new node-interconnecting lines, potentially with one or more new nodes, are displayed indicating future knowledge expansion, transfer and leveraging. Also, button 382 can operate as a fast forward function so that the user can step through animations at sequentially advancing dates to see how certain knowledge expansion/transfer/leveraging might look from perspectives of day to day, week to week, month to month, year to year, etc. Further, the predictive analysis that is performed is filtered or focused based on the other selections the user has made on the dashboard (e.g., theme selection, country/region selection, etc.). A predictive analysis methodology is further described below in the context of FIGS. 5A and 5B.

Below are non-limiting examples of metrics that may be computed (module 106 of FIG. 1) and tracked by system 100:

Contest-related metrics including, but not limited to, # (number of) of ideas, # of ideas advanced, # of comments on ideas, # of idea presentations, # of ideas incubated, # of ideas productized, # of contests world-wide, # of comments per idea (measurement of collaboration);

Open innovation-related metrics including, but not limited to, # of collaborations with external business partners (e.g., suppliers, universities, joint ventures), # of distributed creativity contests (e.g., customer design contests, crowd sourcing, open innovation networks), # of acquisitions, corporate venture capital, # of spin-offs/startups, # of technology licensing agreements, # of open source initiatives;

University-related metrics including, but not limited to, # of company visits to universities, # of university visits to company, # of interns working on university research, # of co-op projects;

Patent-related metrics including, but not limited to, # of invention disclosures (per business unit and company-wide), # of patent applications (per business unit and company-wide), # of patents (per business unit and company-wide);

Publication-related metrics including, but not limited to, # of publications in-progress, # of publications submitted, # of publications accepted, # of publications presented;

Conference-related metrics including, but not limited to, # of conferences attended, # of conferences sponsored, # of employees attending conferences, # of presentations/papers delivered;

Investment-related metrics including, but not limited to, measures of company resources, measures of company capabilities, measures of company leadership time usage, measures of company processes, measures of company marketing.

Below are non-limiting examples of activities and events, descriptions of which may be logged (module 108 of FIG. 1) and tracked by system 100:

Publication-related activities and events including, but not limited to, deciding to start a paper, external partnering on a paper, finishing a paper, submitting a paper, holding a peer review of a paper, paper acceptance, paper presentation, paper honored or awarded;

Contest-related activities and events including, but not limited to, announcing a contest, starting a contest, ending a contest, judging ideas, presenting an idea, awarding an idea, incubating an idea, leveraging an idea;

Research theme-related activities and events including, but not limited to, announcing a new corporate research theme, removing a previous corporate research theme;

University research-related activities and events including, but not limited to, company personnel visiting a university, university personnel visiting the company, discussing research proposals, prioritizing research proposals, proposing research proposals, funding research proposals, ongoing research meetings, completing research, leveraging research;

Sales/Field interlock-related activities and events (related to research/innovation) including, but not limited to, visits to customer, customer visits, visits to partners, partner visits, visits to startup companies, startup company visits;

Conferences-related activities and events including, but not limited to, conferences attended, sponsored, and/or lectured;

Industry consortium-related activities and events including, but not limited to, industry consortiums sponsored, attended, and/or lectured.

Funding-related activities and events including, but not limited to, funding applied for, presentation/committee meeting, funding received;

Knowledge transfer-related activities and events including, but not limited to, meetings, trips, visits.

It is to be appreciated that the metrics computed and the activities logged are dependent on the environment in which the system will be deployed. In this case, it is assumed that the knowledge management system 100 is deployed in a technology company to track the expansion, transfer and leveraging of knowledge relating to technical research and innovation.

Figure 4B:
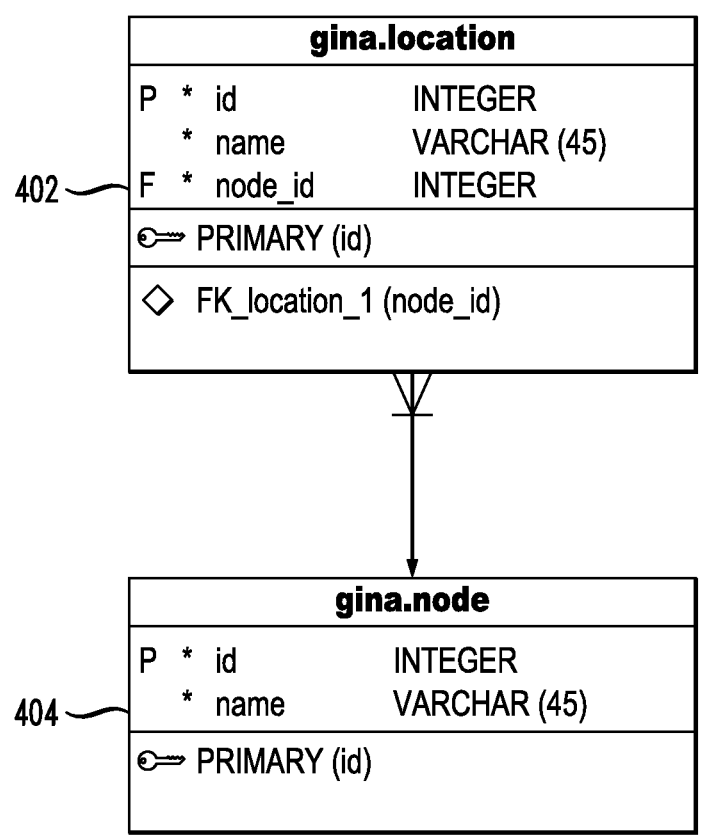
FIGS. 4A through 4N show a database schema and respective schema elements of the knowledge management system of FIG. 1.
Figure 4N:
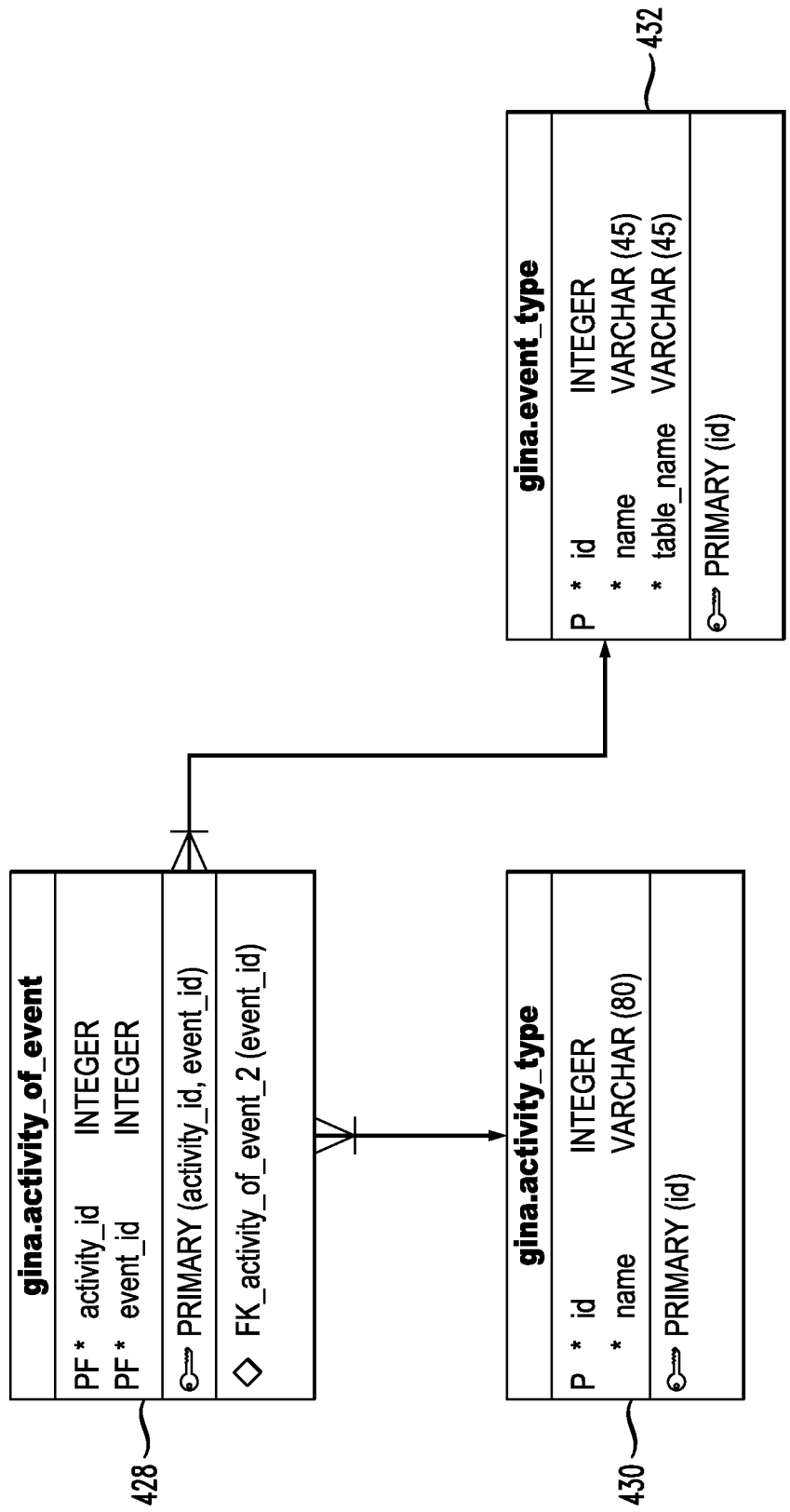

Turning now to FIGS. 4A through 4N, a database schema 400 and respective schema elements are shown of the knowledge management system of FIG. 1. It is to be appreciated that the schema design in the figures is just one example of a design that system 100 can employ. Alternative schema designs can be used.

Recall that the database schema design 400 is configured to accept input data, entries and queries from one or more of system elements 104, 106, 108 and 112, and respond accordingly in order to provide the features and operations described above.

FIG. 4A shows the overall database schema design and the interconnection of the various schema elements that are respectively depicted in FIGS. 4B through 4N.

FIG. 4B shows location element 402 and node element 404. The location element is used to describe the geographic location of each individual involved in the knowledge activity. Sample locations can include major cities such as Saint Petersburg, Beijing, or Cairo. Locations typically map to a larger region of a distributed corporation (such as a country) or to a business unit within a corporation (e.g., the Symmetrix business unit). The location and node elements are useful for mapping knowledge expansion, transfer, and leverage to specific geographies and business units.

FIG. 4C shows user element 406. The user element represents an individual involved in the knowledge activity.

FIG. 4D shows university element 408. The university element represents a specific college or university that is participating in a knowledge activity with employees (users) of a corporation.

FIG. 4E shows strategic driver element 410. A strategic driver is an event that occurs within a corporation that identifies a new strategic theme of great importance to future corporate growth. Example strategic drivers could be "cloud computing" or "big data."

FIG. 4F shows abstract event element 412. An abstract element event is the base event that contains common attributes of all events. For example, all events occur on a specific date (or date range), they happen at a certain location (or locations), and they involve a set of participants. Specific events (e.g., a university event) can inherit from this element. Alternative embodiments could result in every event being represented by one concrete event element containing all possible event fields. Further, as part of the abstract event element, a submitter field can be included. This field tracks the name of the user that inputs the event via the activity log entry module 108. This person also expands their knowledge as they read input sources 109 and enter them into the system, and therefore submitters and the knowledge they possess can be viewed on the dashboard.

FIG. 4G shows university event element 414. A university event element represents a knowledge activity that occurs with a particular university.

FIG. 4H shows conference event element 416. A conference event element represents corporate participation in a conference.

FIG. 4I shows funding event element 418. A funding event element represents the allocation of funds to perform a certain set of knowledge activities, such as funding a university research project.

FIG. 4J shows idea/incubation event element 420. An idea/incubation event element represents a corporate activity whereby ideas are being generated and selectively incubated.

FIG. 4K shows knowledge transfer event element 422. A knowledge transfer event element is an activity whereby employees of a company share information with each other. This knowledge sharing can occur locally (within a node) or globally (across nodes).

FIG. 4L shows publication event element 424. A publication event element represents an activity related to the publication of knowledge articles.

FIG. 4M shows sales event element 426. A sales event element represents a knowledge activity whereby employees of a corporation share knowledge with a customer, a third party, or a partner.

FIG. 4N shows activity of event element 428, activity type element 430, and event type element 432. The event type element maps one-to-one with the theme icons 302 on the left-hand-side of the dashboard 104. The activity type element further classifies event_type. For example, if event_type="university", then activity_type could be "Professor visits Company A", or "Company A lecture at University", or "Co-op project begins". The activity of event element is a relational table which describes the relationship between event_types and activity_types. For example, "Professor visits Company A" is ONLY associated with event_type="university". Lastly, FIGS. 5A and 5B show a predictive analysis methodology 500 in accordance with embodiments of the invention. It is to be appreciated that methodology 500 may be performed in module 112 (as predictive analysis 111) of FIG. 1.

Figure 5A:
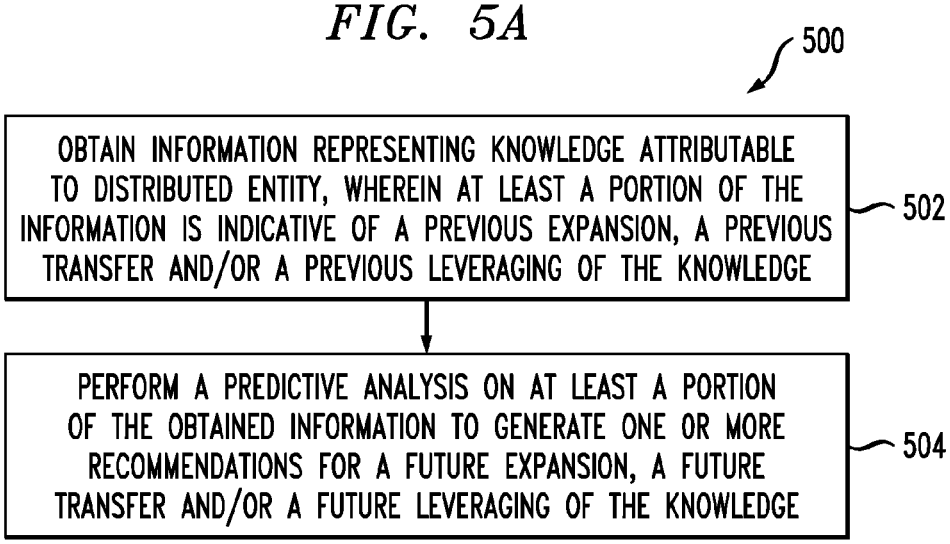
FIGS. 5A and 5B show a predictive analysis methodology in accordance with embodiments of the invention.

As shown in FIG. 5A, methodology 500 includes the following steps. In step 502, the methodology obtains information representing knowledge attributable to the distributed entity. At least a portion of the information is indicative of a previous expansion, a previous transfer and/or a previous leveraging of the knowledge. In step 504, the methodology performs a predictive analysis on at least a portion of the obtained information to generate one or more recommendations for a future expansion, a future transfer and/or a future leveraging of the knowledge.

Figure 5B:
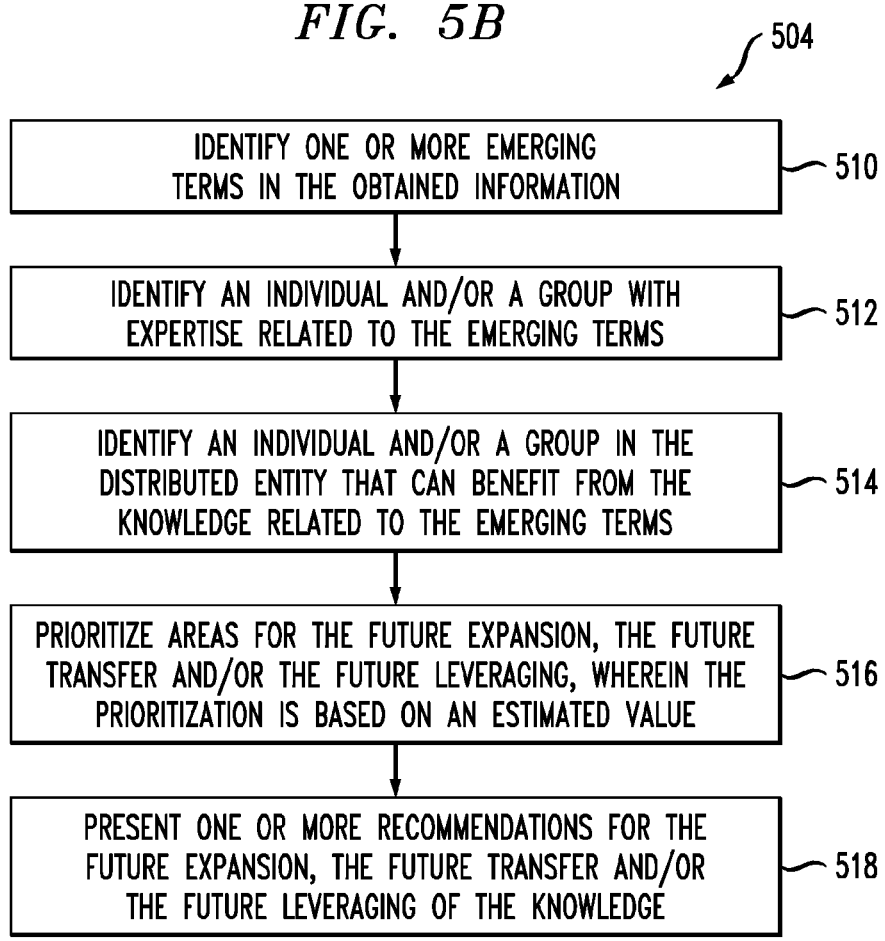

FIG. 5B shows details of the predictive analysis process of step 504 in accordance with one or more illustrative embodiments.

In step 510 of FIG. 5B, the predictive analysis process identifies one or more emerging terms in the information obtained from the database. That is, this step searches the data, or portions thereof, and identifies common trends or concepts that are emerging in the knowledge-based activities that are represented in the database.

In one example, step 510 may comprise collecting structured and unstructured innovation data from database 102. Structured data can be a number, date, set value (e.g., "male" or "female" for gender), etc. Unstructured data could be free-form text (e.g., contents of a word document or email correspondence). Step 510 then issues SELECT queries to the collected data that return (pattern, count) pairs in descending count order, possibly limited to the top k results. A SELECT statement, or query, retrieves data from the database, either from a table or view or from a combination of tables and views: SELECT expression list FROM data source WHERE predicates GROUP BY expression list HAVING predicates ORDER BY expression list. As a simple example, regular expressions can be used to search for patterns in the text. For example, assume there are only eight records in a one hundred record database, where the free-form text field labeled 'conversation' includes the word "cloud." SELECT "cloud", COUNT(*) FROM D WHERE conversation LIKE "cloud" will return "cloud, 8." Of course, more sophisticated matching can be performed on terms and sentiments, or fuzzy matching, or use other technology, rather than employing only regular expressions. A more complicated query could return multiple value-count pairs in ascending order, and limited, for example, by the ten largest counts. Step 510 then returns the results as input to the remainder of the predictive analysis (i.e., step 512). The value-count, or more general, pattern-frequency data can then be used for predictive analytics to do modeling, e.g., linear regression, association rule mining, clustering, etc. The model can be used to predict the future. For example, the system can analyze acquisition data to realize that 10-12 months after the company acquires a new company, the innovation themes (or trending topics) cluster divides into more themes. Thus, the system can predict the "innovation integration" time for a new acquisition and plan for it accordingly, such as setting up theme reviews.

Returning to FIG. 5B, in step 512, the predictive analysis process identifies an individual and/or a group with expertise related to the emerging terms. This person or group may be internal to the company, or external. This step is accomplished by correlating the persons or groups with the emerging terms found in step 510. In one example, a class-fitting correlation technique can be employed.

In step 514 of FIG. 5B, the predictive analysis process identifies an individual and/or a group in the company that can benefit from the knowledge related to the emerging terms. This can also be accomplished by a correlation process.

In step 516, the predictive analysis process prioritizes areas for the future expansion, the future transfer and/or the future leveraging of knowledge, wherein the prioritization is based on an estimated value. That is, when several new areas of knowledge are identified as emerging in multiple locations, the system can prioritize which one or more areas have the highest strategic value (i.e., are the most strategic). For example, one criterion for deciding the most strategic area could be an area that has the most individuals/groups identified as having expertise (step 512) or an area that has the most individuals/groups that can benefit from the emerging concept (step 514). The highest strategic value can also be an estimated value.

In step 518 of FIG. 5B, the predictive analysis process presents one or more recommendations for the future expansion, the future transfer and/or the future leveraging of the knowledge. As explained above in the context of FIG. 3C, these recommendations can be displayed as animations on the dashboard 104. Also, the recommendations can be discrete actions such as generation of an instruction to speak to a given person about an emerging topic, or a directive to design a new product.

Advantageously, embodiments of the invention allow for determining which areas of knowledge to pursue within a corporate research portfolio. For example, when pursuing a new area of knowledge, there is now a way to programmatically determine "who" in a global organization is best suited to expand the knowledge, as well as a way to programmatically determine "with whom" the knowledge should be expanded (e.g., which university should be visited, or which conference should be attended). Also, when a new area of knowledge enters into an organization, there is now a programmatic mechanism to identify that the knowledge is strategic and worth transferring. When new knowledge enters a corporation that is worth transferring within an organization, there is now a mechanism to determine "to whom" that new knowledge should be transferred. When new strategic knowledge is transferred within a corporation, there is now a way to determine if the knowledge should be strategically leveraged, and who should strategically leverage the knowledge, and how they should do it.

Other exemplary advantages of the knowledge management system and techniques described herein include avoidance of duplication of similar research activities in different locations, thus resulting in a savings in budget and human resources. Also, the system and techniques leverage advances of different ecosystems over the world, thus connecting the right people inside and outside of the subject company. Further, they serve to create a platform for effective collaboration of virtual research teams distributed around the globe but belonging to the same company. Still further, they allow fair measuring for research and development type activities, as opposed to only measuring return on investment. These and other advantages will be realized by those ordinarily skilled in the art given the illustrative descriptions herein.

It is to be appreciated that, in one or more embodiments, the knowledge management system and techniques described herein can be implemented in accordance with a "big data" architecture-based system. As is known, "big data" refers to data sets whose size is so large as to be beyond the ability of commonly used software tools to manage/process the data within a suitable time frame. By way of example only, such a system architecture may include the architecture referred to as the EMC GREENPLUM™ HD Data Computing Appliance (EMC Corporation, Hopkinton, Mass.) which adapts Apache HADOOP™ (Apache Software Foundation) open-source software to provide "big data" analytics. Thus, the knowledge management database described herein is not limited to defined structures. For example, it could use "big data" file systems, and it could also manage unstructured data (examples include, but are not limited to, white papers, publications, patent applications, incubation documents, university project agreements, etc.). Still further, each geographical cluster could be within a cloud. For example, a dedicated cloud could perform the role of reporting, dashboards and analytics management. Thus, various functions and geographies could be decoupled, and managed via dedicated clouds. One or more of the above-mentioned big data architecture-based systems could be assigned to each dedicated cloud.

Also, it is to be further appreciated that various analytics can be run over the knowledge management database described herein to generate graphs such as, but not limited to, social network graphs, histograms, etc.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
maintaining a database of information representing knowledge attributable to at least one distributed entity in a plurality of elements, wherein at least a portion of the information is indicative of at least one of a previous expansion, a previous transfer and a previous leveraging of the knowledge attributable to the at least one distributed entity;
performing a predictive analysis for an interval of time specified by a user on at least a portion of the information to selectively generate one or more recommendations for a future expansion, a future transfer and a future leveraging of the knowledge attributable to the at least one distributed entity for the user-specified interval of time, wherein the predictive analysis comprises:
calculating one or more metrics, the one or more metrics comprising quantitative values associated with one or more knowledge-based activities attributable to the at least one distributed entity;
utilizing the calculated metrics and the plurality of elements to generate pattern-frequency data to model the future expansion, the future transfer and the future leveraging of knowledge attributable to the at least one distributed entity;
identifying one or more emerging terms based on the modeling of the future expansion, the future transfer and the future leveraging of knowledge attributable to the at least one distributed entity, the one or more emerging terms representing at least one of a trend and a concept that is emerging in at least one knowledge-based activity;
identifying one or more individuals or groups having expertise related to the one or more emerging terms; and
prioritizing one or more recommendations for at least one of the future expansion, the future transfer and the future leveraging of knowledge attributable to the at least one distributed entity to one or more locations within the distributed entity based on a quantitatively measurable strategic value, the strategic value being based at least in part on concentrations of individuals or groups having expertise related to the one or more emerging terms in respective ones of the one or more locations; and
providing an interface for presenting the one or more recommendations in the form of a user-controllable display to provide the user with a visualization of the one or more recommendations;
wherein calculating the one or more metrics comprises: receiving user selection of one or more context and constraint parameters for the visualization; and dynamically calculating the metrics based on the user-selected context and constraint parameters;
wherein presenting the one or more recommendations comprises: displaying the dynamically calculated metrics in a dashboard of the user-controllable display; and providing the visualization based on the dynamically calculated metrics; and
wherein the steps are performed by at least one processing device comprising a processor coupled to a memory.

2. The method of claim 1, wherein the one or more individuals or groups having expertise related to the one or more emerging terms comprise at least one individual or group that is external to the at least one distributed entity.

3. The method of claim 1, wherein the one or more individuals or groups having expertise related to the one or more emerging terms comprise at least one individual or group that is internal to the at least one distributed entity.

4. The method of claim 1, wherein the predictive analysis performing step further comprises identifying from the information maintained in the database at least one of an individual and a group in the at least one distributed entity that can benefit from the knowledge related to the one or more emerging terms.

5. The method of claim 1, wherein the information representing the knowledge attributable to at least one distributed entity is obtained from the database.

6. The method of claim 1, wherein the visualization comprises an animation of one or more node-interconnecting lines indicative of the one or more recommendations for a future expansion of at least a portion of the knowledge attributable to the at least one distributed entity within a given geographic region, a future transfer of at least a portion of the knowledge attributable to the at least one distributed entity between two or more geographic regions and a future leveraging of the knowledge attributable to the at least one distributed entity at a given geographic location, the one or more node-interconnecting lines representing paths that respective pieces of knowledge take across geographic locations in the at least one distributed entity.

7. The method of claim 6, wherein the user-controllable display comprises a feature allowing the user to control the animation to view the one or more recommendations at sequentially advancing times within the user-specified interval of time.

8. The method of claim 7, wherein the sequentially advancing times are selectable from at least one of a day-to-day perspective, a week-to-week perspective, and a year-to-year perspective.

9. The method of claim 1, wherein the plurality of elements comprise:
  one or more abstract event elements, each abstract event element being associated with a respective one of a plurality of events, the abstract event elements identifying values of attributes common to the plurality of events;
  one or more user elements, each user element identifying a user associated with the at least one distributed entity;
  one or more location elements, each location element identifying a location of a user involved in a given one of the plurality of events;
  one or more strategic driver elements, each strategic driver element being associated with a given one of the plurality of events and identifying a strategic theme for the at least one distributed entity;
  one or more specific event elements associated with respective ones of the plurality of events, each event type element comprising at least one of a university event, a conference event, a funding event, an idea event, an incubation event, a knowledge transfer event, a publication event and a sales event;
  one or more event type elements, each event type element mapping to a respective one of a plurality of research and innovation themes;
  one or more activity type elements, each activity type element identifying an activity performed by a user associated with the at least one distributed entity for a given one of the plurality of events; and
  one or more activity of event elements, each activity of event element comprising a relational table describing a relationship between at least one activity type element and at least one event type element.

10. The method of claim 9, wherein a given one of the abstract event elements has an inheritance relationship with: at least one of the event type elements, at least one of the activity type elements, at least one of the event type element and at least one of the location elements.

11. A computer program product comprising a non-transitory processor-readable storage medium having encoded therein executable code of one or more software programs, wherein the one or more software programs when executed by a processor of a processing device implement the steps of:
  maintaining a database of information representing knowledge attributable to at least one distributed entity in a plurality of elements, wherein at least a portion of the information is indicative of at least one of a previous expansion, a previous transfer and a previous leveraging of the knowledge attributable to the at least one distributed entity;
  performing a predictive analysis for an interval of time specified by a user on at least a portion of the information to selectively generate one or more recommendations for a future expansion, a future transfer and a future leveraging of the knowledge attributable to the at least one distributed entity for the user-specified interval of time, wherein the predictive analysis comprises:
    calculating one or more metrics, the one or more metrics comprising quantitative values associated with one or more knowledge-based activities attributable to the at least one distributed entity;
    utilizing the calculated metrics and the plurality of elements to generate pattern-frequency data to model the future expansion, the future transfer and the future leveraging of knowledge attributable to the at least one distributed entity;
    identifying one or more emerging terms based on the modeling of the future expansion, the future transfer and the future leveraging of knowledge attributable to the at least one distributed entity, the one or more emerging terms representing at least one of a trend and a concept that is emerging in at least one knowledge-based activity;
    identifying one or more individuals or groups having expertise related to the one or more emerging terms; and
    prioritizing one or more recommendations for at least one of the future expansion, the future transfer and the future leveraging of knowledge attributable to the at least one distributed entity to one or more locations within the distributed entity based on a quantitatively measurable strategic value, the strategic value being based at least in part on concentrations of individuals or groups having expertise related to the one or more emerging terms in respective ones of the one or more locations; and
  providing an interface for presenting the one or more recommendations in the form of a user-controllable display to provide the user with a visualization of the one or more recommendations;
  wherein calculating the one or more metrics comprises: receiving user selection of one or more context and constraint parameters for the visualization; and dynamically calculating the metrics based on the user-selected context and constraint parameters; and
  wherein presenting the one or more recommendations comprises: displaying the dynamically calculated metrics in a dashboard of the user-controllable display; and providing the visualization based on the dynamically calculated metrics.

12. An apparatus comprising:
a memory; and
a processor operatively coupled to the memory and configured to:
maintain in a database information representing knowledge attributable to at least one distributed entity in a plurality of elements, wherein at least a portion of the information is indicative of at least one of a previous expansion, a previous transfer and a previous leveraging of the knowledge attributable to the at least one distributed entity;
perform a predictive analysis for an interval of time specified by a user on at least a portion of the obtained information to selectively generate one or more recommendations for a future expansion, a future transfer and a future leveraging of the knowledge attributable to the at least one distributed entity for the user-specified interval of time, wherein the predictive analysis comprises:

calculating one or more metrics, the one or more metrics comprising quantitative values associated with one or more knowledge-based activities attributable to the at least one distributed entity;

utilizing the calculated metrics and the plurality of elements to generate pattern-frequency data to model the future expansion, the future transfer and the future leveraging of knowledge attributable to the at least one distributed entity;

identifying one or more emerging terms based on the modeling of the future expansion, the future transfer and the future leveraging of knowledge attributable to the at least one distributed entity, the one or more emerging terms representing at least one of a trend and a concept that is emerging in at least one knowledge-based activity;

identifying one or more individuals or groups having expertise related to the one or more emerging terms; and prioritizing one or more recommendations for at least one of the future expansion, the future transfer and the future leveraging of knowledge attributable to the at least one entity to one or more locations within the distributed entity based on a quantitatively measurable strategic value, the strategic value being based at least in part on concentrations of individuals or groups having expertise related to the one or more emerging terms in respective ones of the one or more locations; and provide an interface for presenting the one or more recommendations in the form of a user-controllable display to provide the user with a visualization of the one or more recommendations;

wherein calculating the one or more metrics comprises: receiving user selection of one or more context and constraint parameters for the visualization; and dynamically calculating the metrics based on the user-selected context and constraint parameters; and wherein presenting the one or more recommendations comprises: displaying the dynamically calculated metrics in a dashboard of the user-controllable display; and providing the visualization based on the dynamically calculated metrics.

13. The apparatus of claim 12, wherein the one or more individuals or groups having expertise related to the one or more emerging terms comprise at least one individual or group that is external to the at least one distributed entity.

14. The apparatus of claim 12, wherein the one or more individuals or groups having expertise related to the one or more emerging terms comprise at least one individual or group that is internal to the at least one distributed entity.

15. The method of claim 12, wherein the predictive analysis performed by the processor further comprises identifying from the information maintained in the database at least one of an individual and a group in the at least one distributed entity that can benefit from the knowledge related to the one or more emerging terms.

16. The apparatus of claim 12, wherein the information representing the knowledge attributable to at least one distributed entity is obtained from the database stored in the memory.

17. The apparatus of claim 12, wherein the visualization comprises an animation of one or more node-interconnecting lines indicative of the one or more recommendations for a future expansion of at least a portion of the knowledge attributable to the at least one distributed entity within a given geographic region, a future transfer of at least a portion of the knowledge attributable to the at least one distributed entity between two or more geographic regions and a future leveraging of the knowledge attributable to the at least one distributed entity at a given geographic location, the one or more node-interconnecting lines representing paths that respective pieces of knowledge take across geographic locations in the at least one distributed entity.

18. The apparatus of claim 17, wherein the user-controllable display comprises a feature allowing the user to control the animation to view the one or more recommendations at sequentially advancing times within the user-specified interval of time.

19. The apparatus of claim 18, wherein the sequentially advancing times are selectable from at least one of a day-to-day perspective, a week-to-week perspective, and a year-to-year perspective.

* * * * *